United States Patent [19]

Perez et al.

[11] Patent Number: 5,633,748

[45] Date of Patent: May 27, 1997

[54] FIBER OPTIC BRAGG GRATING DEMODULATOR AND SENSOR INCORPORATING SAME

[75] Inventors: Ignacio M. Perez, Prince Frederick, Md.; Thomas F. A. Bibby, Jr., Gilbert, Ariz.

[73] Assignee: The United States of America as represented by the Secretary of the Navy, Washington, D.C.

[21] Appl. No.: 611,044

[22] Filed: Mar. 5, 1996

[51] Int. Cl.[6] ................................. G02F 2/00; G01J 4/00
[52] U.S. Cl. .................. 359/325; 250/227.18; 385/4; 385/30; 385/13; 356/345
[58] Field of Search .............................. 359/325, 159; 250/227.18, 227.19; 385/13, 4, 30; 356/345, 352, 28.5

[56] References Cited

U.S. PATENT DOCUMENTS

| | | | |
|---|---|---|---|
| 4,761,073 | 8/1988 | Meltz et al. | 250/227.18 |
| 5,039,221 | 8/1991 | Layton et al. | 356/345 |
| 5,380,995 | 1/1995 | Udd et al. | 250/227.18 |
| 5,394,488 | 2/1995 | Fernald et al. | 385/13 |
| 5,397,891 | 3/1995 | Udd et al. | 250/227.18 |

*Primary Examiner*—Loha Ben
*Attorney, Agent, or Firm*—Susan E. Verona; Ron Billi

[57] ABSTRACT

A tapped Bragg grating is used to demodulate optical signals reflected by fiber optic Bragg gratings in a sensor in which the line spacings in the fiber optic Bragg gratings vary in response to a mechanical stress. A light detector, or light detector array is used to detect variation in the angular pattern of the light scattered by the tapped Bragg grating. Arrangements of mirrors, or alternatively arrangements of lenses, are used to concentrate the scattered light toward the light detectors and to enhance the angular changes in the scattered light.

19 Claims, 7 Drawing Sheets

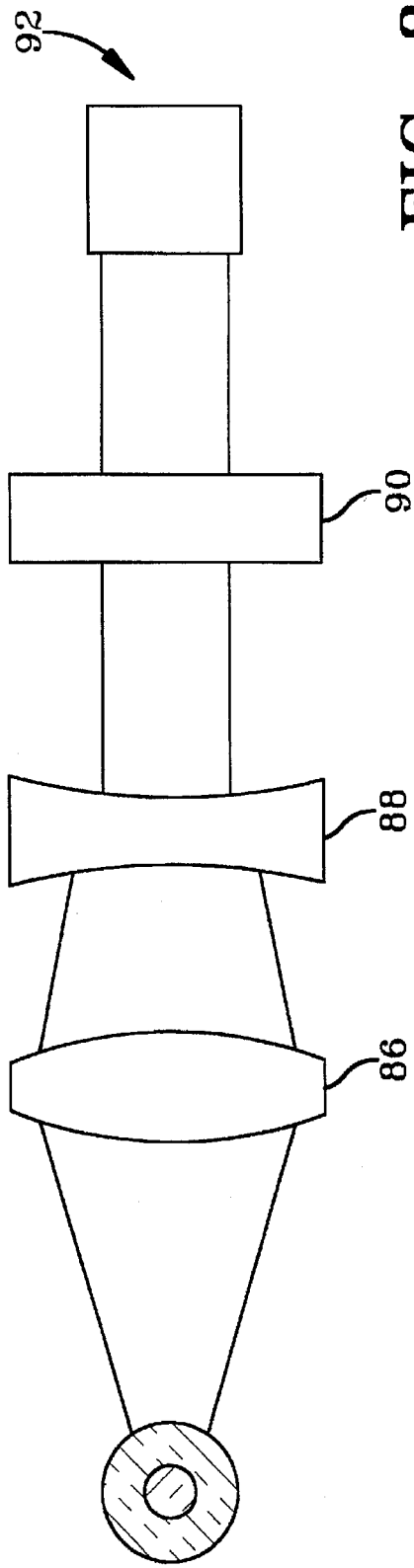
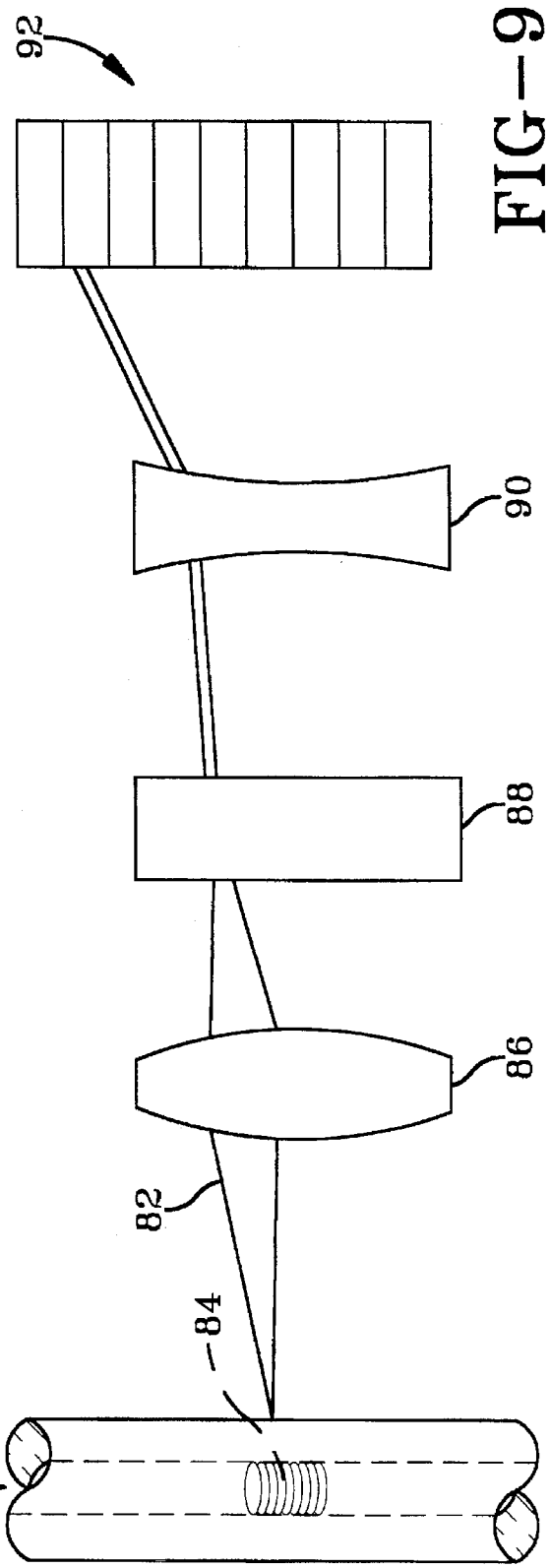

FIBER OPTIC BRAGG GRATING DEMODULATOR AND SENSOR INCORPORATING SAME

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates generally to sensors for monitoring extremely small mechanical displacements, and in particular to an improvement in a Fiber Optic Bragg Grating (FOBG) sensor consisting of a unique demodulator for detecting changes in an optical signal induced by the sensed mechanical displacement. The invention has broad utility in applications in which small mechanical displacements are to be detected, for example in monitoring stresses in advanced materials used in aircraft components and detecting the onset of corrosion.

A typical FOBG consists of a Bragg grating formed within the core of an optical fiber. The grating consists of a region within the core, having a periodic spatial variation in its refractive index along the direction of the axis of the fiber core. Because of the spatial variations in the refractive index, the core of the optical fiber effectively has "lines," i.e. subregions of alternating higher and lower refractive index. These gratings may be formed by exposing a doped optical fiber to an interference pattern formed by two laser beams. The varying energy density in the interference pattern induces permanent changes in the index of refraction of the core of the optical fiber.

In practice, a coherent, but relatively broad band, light source is coupled to an optical fiber having one or more Bragg gratings. Each of the Bragg gratings reflects light in a narrow band of wavelengths which depends on the spacing of the lines of the grating. The reflected light beam is transmitted through a two-way optical coupler to a spectrum analyzer which, in effect "demodulates" the light beam modulated by the gratings. The spectrum analyzer is able to extract useful information concerning the condition of the gratings. The optical fiber may be coupled to an article under mechanical stress so that strain in the article effects changes in the spacing of the grating elements. The resulting changes in the spectrum of the returning light beam are detected and interpreted to obtain information on the strain in the article under stress.

A single optical fiber can incorporate several Bragg gratings, and the gratings can have different line spacings so that they reflect different bands of wavelengths. This makes it possible to distinguish between the optical signals returned by several gratings in a single optical fiber.

Previously known demodulation schemes include broadband optical filtering, and interferometry using a Fabry Perot cavity. These have various deficiencies such as high cost, bulkiness and sensitivity to thermal fluctuations and/or mechanical vibrations.

SUMMARY OF THE INVENTION

The general object of this invention is to provide a simple, compact and inexpensive device for demodulating the optical signals returned by a Bragg grating under stress. Another object of the invention is to provide a simple and effective device for determining the locations of excessive strain in a material. Still another object of the invention is to provide a demodulator having enhanced sensitivity. Still another object is to provide a simple and inexpensive sensor for detecting extremely small changes in a measurand, i.e. a parameter to be measured or in which a change is to be detected, for example stress, temperature, pressure, displacement, etc.

In accordance with this invention, a simple, compact and inexpensive demodulation technique utilizes a Tapped Bragg Grating (TBG) to demodulate the light reflected by one or more sensing FOBGs.

The demodulator comprises an optical fiber capable of receiving and conducting light reflected by a fiberoptic Bragg grating, means, comprising a tapped Bragg grating formed in the core of the optical fiber, for scattering light conducted by the optical fiber at angles varying in dependence on the wavelength of the reflected light, and means for detecting shifts in the pattern the light scattered by the tapped Bragg grating.

A sensor in accordance with the invention preferably comprises a first Bragg grating with grating lines arranged to reflect selected wavelengths of light incident on the first grating, means responsive to a measurand for inducing variations in the spacing of the lines of first grating, and means for directing light to the first Bragg grating. The sensor includes a demodulator utilizing a second Bragg grating arranged to scatter light reflected by the first Bragg grating, and light-detecting means disposed adjacent to the second grating, for detecting shifts in the pattern the light scattered by the second grating, and thereby detecting variations in the spacing of the lines of the first grating induced by the means responsive to the measurand.

The TBG demodulator makes it possible to demodulate the optical signal returned by an FOBG sensor or FOBG sensor array reliably, inexpensively and with a very high degree of sensitivity to very small mechanical displacements.

Other objects, advantages and novel features of the invention will become apparent from the following detailed description of the invention, when considered in conjunction with the accompanying drawings.

BRIEF DESCRIPTION OF THE DRAWINGS

FIG. 8 is an elevational view, partly in section, showing a TBG demodulator having a condensing lens, a pair of cylindrical concave lenses and a light detecting array;

FIG. 9 is a plan view of the demodulator of FIG. 8;

DESCRIPTION OF THE PREFERRED EMBODIMENTS

Figure 1:
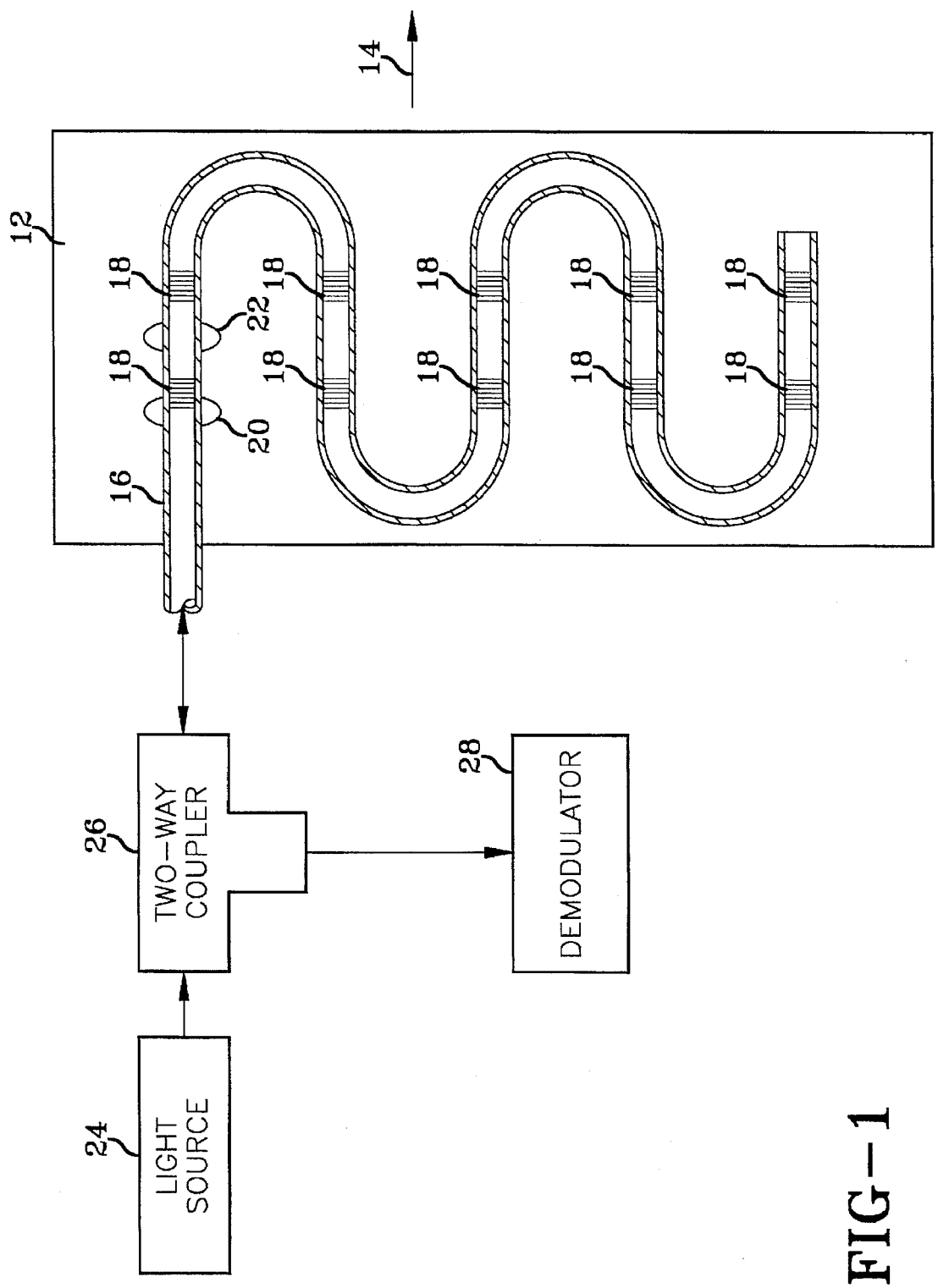
FIG. 1 is a schematic view of an FOBG sensor including a demodulator in accordance with the invention.

FIG. 1 shows a substrate 12, which is under mechanical stress. The substrate can be, for example, a graphite/epoxy composite, used as a component of an aircraft. In this case, the applied stress may be a tensile stress exerted in the direction of arrow 14, or it may be a bending stress tending to bend the substrate about an axis extending vertically in FIG. 1.

To determine the location of excessive strain in the substrate, an optical fiber 16, having a plurality of Bragg gratings 18 formed in its core, is secured to the substrate by a stiff adhesive. The fiber is situated on the substrate so that the gratings extend parallel to arrow 14. An adhesive rigidly bonds the fiber to the substrate at least adjacent to both ends of each grating. Adhesive beads 20 and 22 may be used, for example. By securing the fiber to the substrate in this fashion, portions of the optical fiber containing the gratings are stressed longitudinally in response to a strain in the substrate resulting from a stress exerted in the direction of arrow 14 or a bending stress about a vertical axis. Alternatively, the entire fiber, or the portions of the fiber containing the gratings, can be embedded in a sealant or in a polymer layer added to the surface of the substrate. The fiber, or parts thereof, can also be embedded within the composite material itself.

A light source 24, which produces an "interrogation beam," is connected to one end of fiber 16 through a two-way coupler 26, which delivers light reflected by the Bragg gratings to a demodulator 28. The coupler can be a conventional fiber optic device known as a 3 dB coupler, in which a pair of optical fibers are fused together with their cores in close proximity to each other. With the fiber cores positioned in close proximity, a portion of the light energy in the core of one fiber passes to the core of the other fiber.

The light source should be a broad band light source, i.e. one producing an interrogation beam having a continuous spectrum with a band of wavelengths rather than essentially monochromatic light. In general, it is desirable to avoid light sources having sharp spectral peaks or valleys within the band of wavelengths of interest. Typical light sources usable in this invention include Xenon lamps, quartz lamps, both of which are relatively broad band light sources. However, even laser diodes can be used, since their output bandwidth is typically much broader, e.g. 700 times broader, than the bandwidth of the light reflected by an FOBG. In general, in a sensor apparatus in accordance with this invention, the bandwidth of the light source should be at least about ten times the bandwidth of the reflection of an FOBG.

Each of the gratings 18 consists of a region in the optical fiber core in which the index of refraction varies periodically along the length of the fiber to produce grating "lines." In optical fiber 16, the lines extend perpendicular to the axis of the fiber so that they are capable of reflecting selected bands of wavelengths in the incident light in the reverse direction. Each of the gratings 18 has a different line spacing, so that the wavelengths of the reflections from the different gratings are different and distinguishable. This makes it possible to determine which of the several gratings is under stress. The fiber should be provided with a non-reflecting termination (not shown).

While FIG. 1 shows a typical sensor configuration, other configurations can be used, including configurations in which the optical fiber has only one grating.

The purpose of the demodulator 28 is to extract, from the light reflected by the gratings, information concerning changes in the spacings of the grating lines. FIGS. 2–11 show examples of different demodulators, all utilizing tapped Bragg gratings (TBGs).

In each case, the TBG consists of a region, in the core of an optical fiber, having a periodic spatial variation in its refractive index. Unlike the sensing FOBGs, however, the TBG grating lines are oblique with respect to the axis of the optical fiber. The TBG scatters light in a fan-shaped lobe in a direction transverse to the axis of the fiber. The width of the lobe depends on a number of factors, including the spectral width of the light approaching the grating, the angle of the grating lines, and the length of the grating. A longer grating produces a lobe having a narrower width. The angle of the scattered light $\theta_{SCATT}$, depends on the Bragg angle $\theta_B$ i.e. the inclination of the grating lines, on the Bragg period $\lambda_B$ i.e. the distance from a point on one grating line to a corresponding point on the next line multiplied by $\cos \theta_B$, the wavelength $\lambda$ of the incident light, the index of refraction $n_{CL}$ of the cladding of the optical fiber and the radius R of the fiber.

The equations that are needed for fabrication of a tapped Bragg grating are the following:

$$\beta - kn_{CL}\cos(\theta_{SCATT}) = K_B\sin(\theta_B)$$

where:

$\beta$ is the propagation constant;
k is the wave number ($2\pi/\lambda$)
$\lambda$ is the wavelength of the incoming light in a vacuum
$n_{CL}$ is the refractive index of the cladding;
$K_B$ is the Bragg wave number ($2\pi/\lambda_B$);
$\lambda_B$ is the Bragg period; and
$\theta_B$ is the Bragg angle.

$$kn_{CL}\sin(\theta_{SCATT}) = K_B\cos(\theta_B) \pm \frac{u(\beta)}{R}$$

where:

R is the radius of the fiber;

$$u(\beta) = R(k^2 n_{CO}^2 - \beta^2)^{\frac{1}{2}}$$

and $n_{CO}$ is the refractive index of the core of the fiber.

Figure 2:
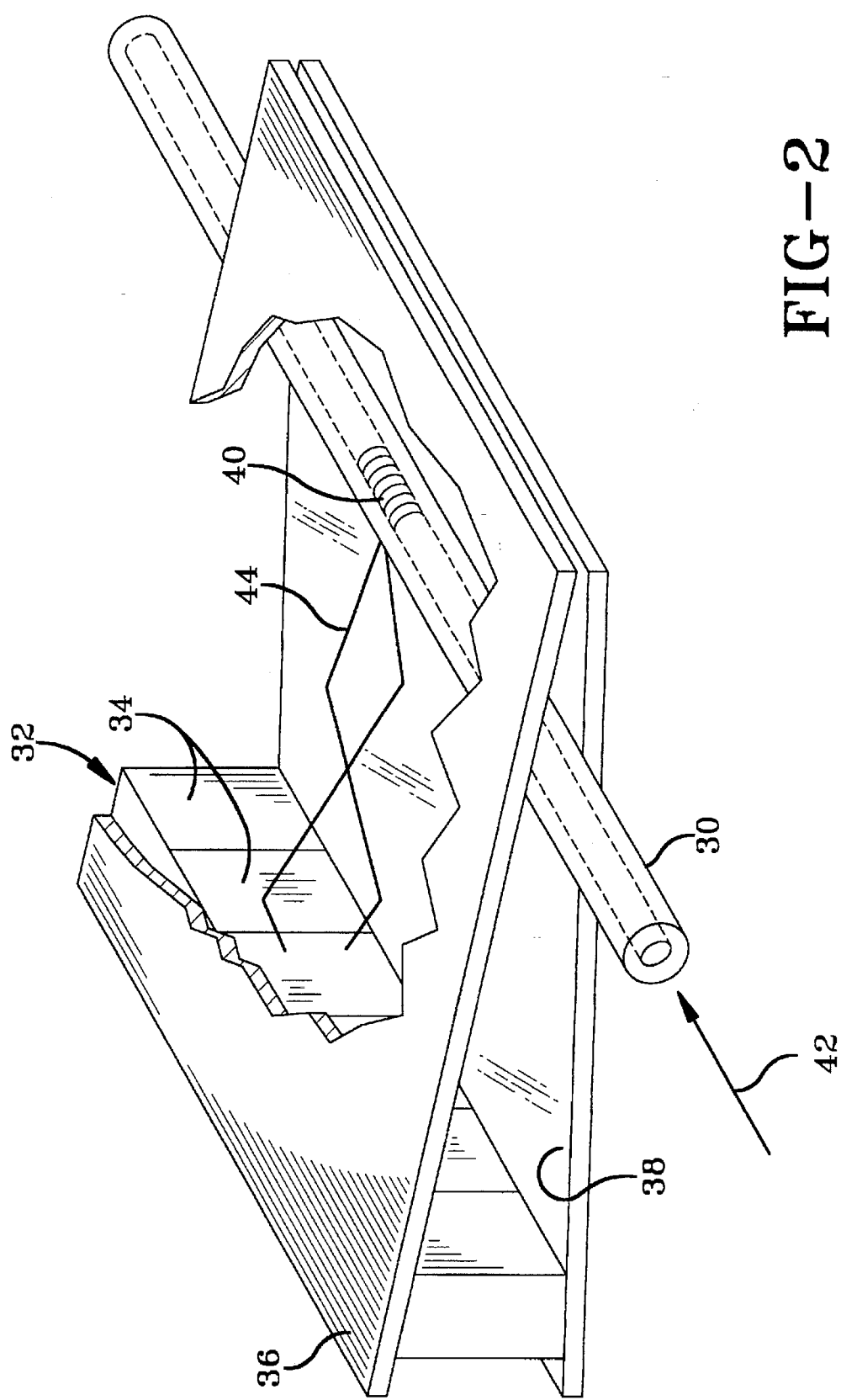
FIG. 2 is a perspective view, partially broken away, of a demodulator having an optical fiber with a tapped Bragg grating (TBG) and an array of light detectors, and utilizing a pair of planar mirrors.

The amount of light reflected by any FOBG is relatively small, and consequently it is important to collect as much of it as possible. Various techniques are used to enhance the collection of light in the TBG demodulator. In FIG. 2, for example, the demodulator comprises an optical fiber 30 extending parallel to a straight, linear array 32 of light detectors 34, which may be photodiodes, or other light-responsive transducers. The fiber 30 is located between two planar mirrors 36 and 38, which are situated in intersecting planes, with their reflecting surfaces facing each other. The optical fiber is situated substantially parallel to the line of intersection of the two planes, and the optical detector array is preferably parallel to the fiber. Preferably, both the fiber and the light detector array are sandwiched between the two mirrors.

A TBG 40 is formed within the core of fiber 30. The lines of the TBG are oblique with respect to the axis of the fiber's core. Light from the sensors in fiber 16 (FIG. 1) enters optical fiber 30 in the direction of arrow 42, and, within a narrow band of wavelengths, light is scattered laterally through the wall of the fiber toward the detector array. The scattered light is depicted by beam 44. The mirrors reflect the upper and lower portions of the scattered light beam, and concentrate the beam toward the detector array. The TBG is a relatively broad band device, and a change in the wavelength of the light impinging on the TBG, will affect the angle at which light is scattered by the TBG. Therefore, a change in the spacing of the lines of a particular FOBG sensor in FIG. 1 can change the angle of beam 44, causing it to activate different detectors in detector array 32. The use of planar mirrors for concentrating scattered light toward the detector array has the advantage that it is very simple and inexpensive.

In a typical sensor apparatus, having multiple FOBG sensors, there is only one TBG. Alternatively, multiple TBGs, for separately demodulating optical signals from the several FOBG sensors, may be provided within a single optical fiber. Alternatively, a single TBG may be capable of scattering light reflected by more than one FOBG sensor, provided that the reflected wavelengths are not too far apart.

Figure 3:
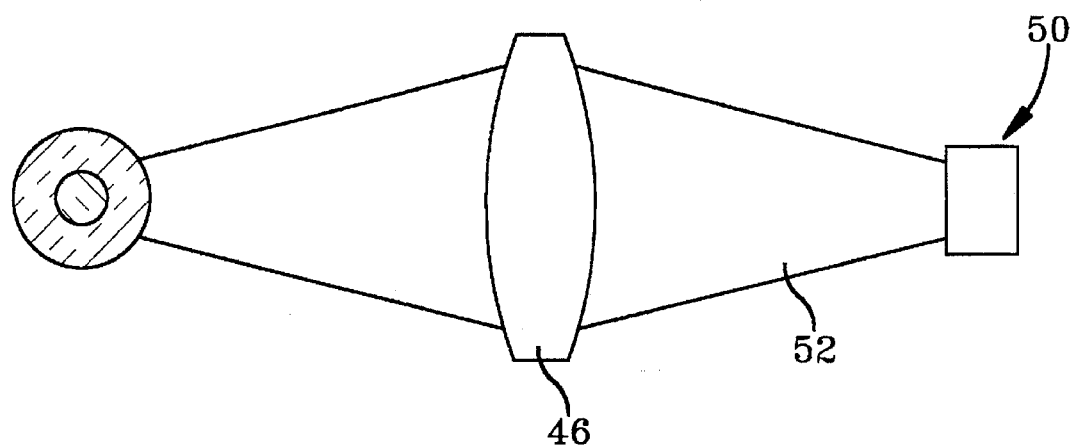
FIG. 3 is an elevational view, partly in section, showing a demodulator comprising an optical fiber having a TBG, and a cylindrical condensing lens.
Figure 4:
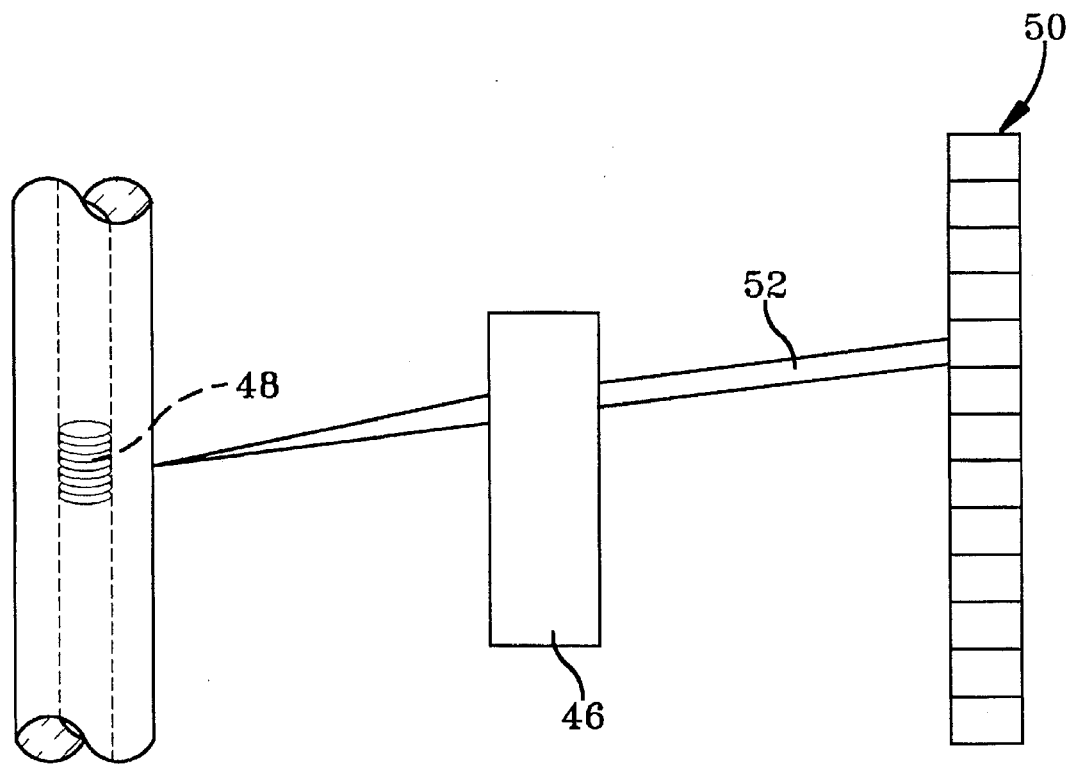
FIG. 4 is a plan view of the demodulator of FIG. 3.

In FIGS. 3 and 4, a cylindrical condensing lens 46 is used to collect light scattered by TBG 48 and concentrate the light on a linear array 50 of light detectors. The cylindrical condensing lens 46 has the advantage that it focuses the fan-shaped beam 52 into a small spot at the detector, as shown in FIG. 3.

Figure 5:
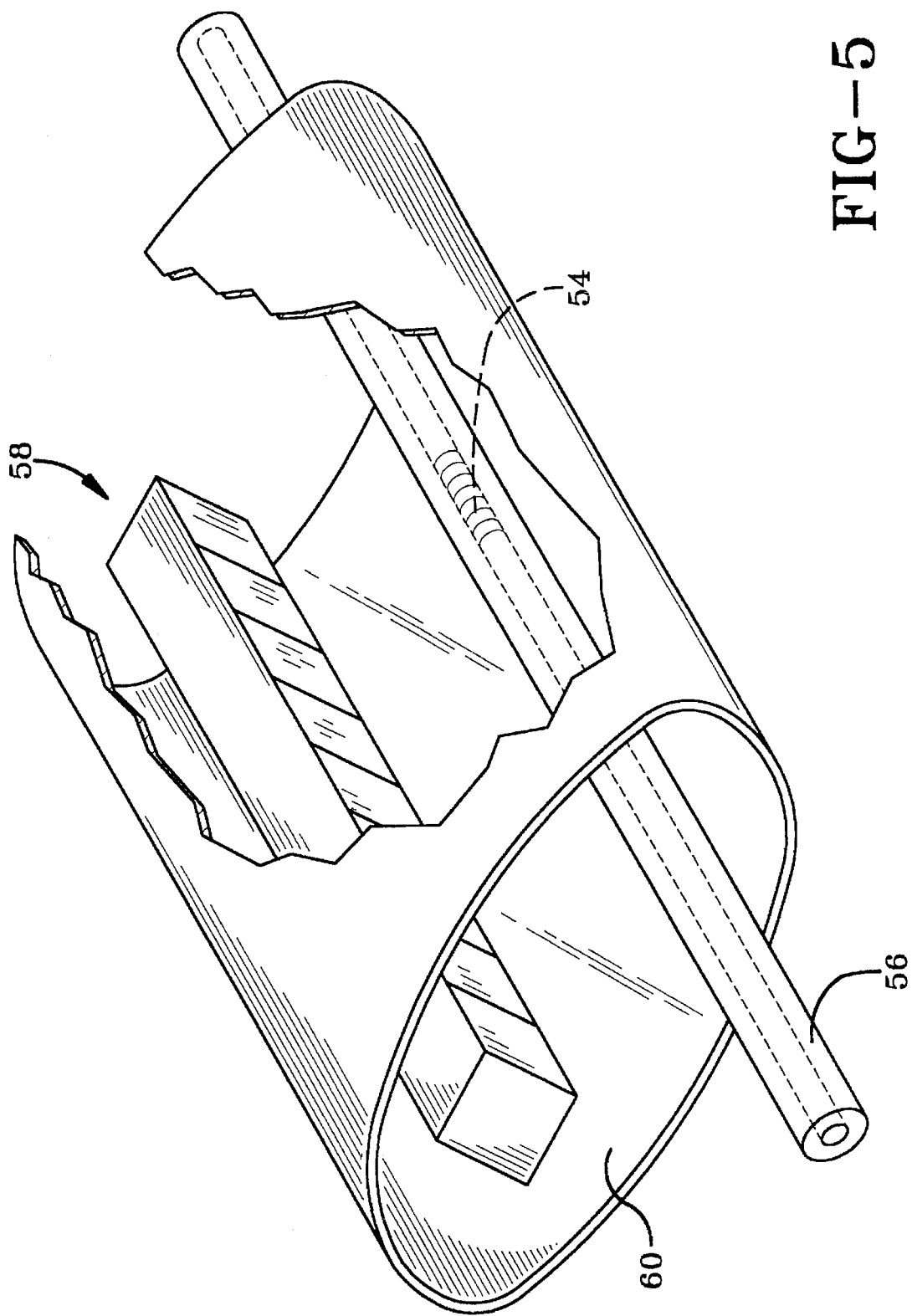
FIG. 5 is a perspective view, partially broken away, of a demodulator having an optical fiber with a TBG and an array of light detectors at the respective foci of an elliptical mirror.

In FIG. 5, an elliptical mirror is used to concentrate light scattered by TBG 54 in fiber 56 onto detector array 58. The mirror has an internal reflecting surface 60 with a uniform elliptical cross-section. The fiber 56 is situated so that its axis is aligned with one focus of the ellipse, while detector array is a straight, linear array aligned with the other focus of the ellipse. This arrangement provides a maximum concentration of the scattered light onto the detector array.

Figure 6:
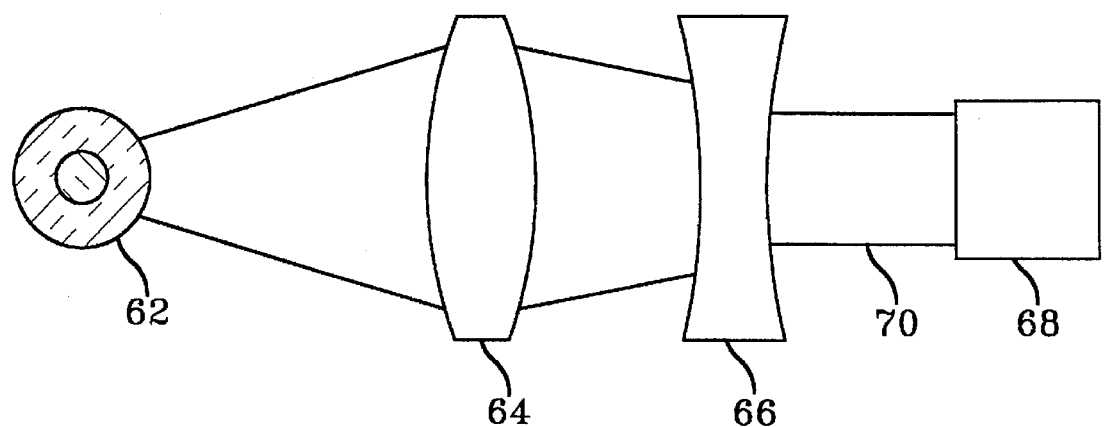
FIG. 6 is an elevational view, partly in section, showing a TBG demodulator having a condensing lens, a cylindrical concave lens and a light detecting array.

In FIG. 6, light scattered by a TBG (not shown) in the core of optical fiber 62 is concentrated by a cylindrical condensing lens 64 and then collimated by a cylindrical diverging lens 66, located between lens 64 and a linear detector array 68. A change in the wavelength of the scattered light causes the beam 70 to shift in a direction perpendicular to the plane of the drawing. The collimation of the scattered light by lens 66 is particularly useful where a linear detector array is used, because it prevents the scattered light from losing focus at the extreme ends of the array.

If the measurand causes only very small shifts in the wavelength of the reflected light, the corresponding angular shift is also very small. It is desirable to enhance the angular shift.

Figure 7:
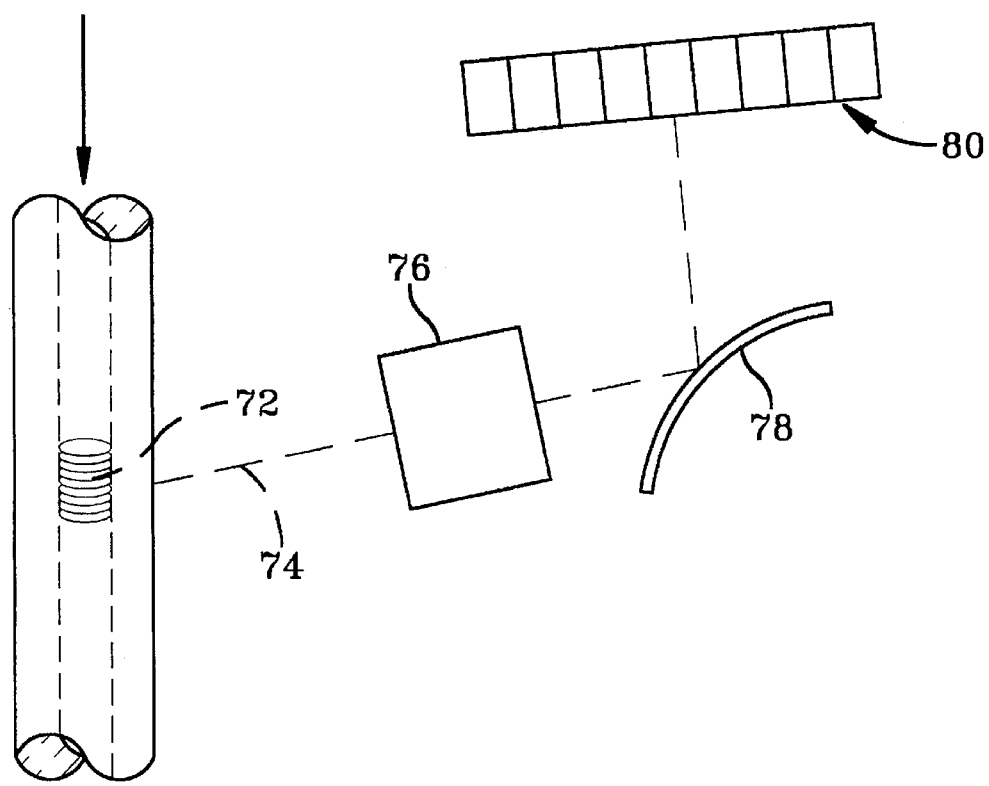
FIG. 7 is a plan view of a TBG demodulator having a collimating lens, a convex mirror and a detector array.

One way to enhance the angular shift of the scattered beam is to use the arrangement depicted in FIG. 7, in which the TBG 72 produces a beam 74, which passes through a combined condensing and collimating lens 76 to a cylindrical convex mirror 78, from which it is reflected toward a detector array 80. A very small change in the angle at which beam 74 is scattered by the TBG produces a large change in the angle at which the beam is reflected by mirror 78. The curvature of the mirror, and the length and location of the detector array, may be chosen on the basis of the predicted angular shift, so that the detector array is capable of intercepting the beam throughout its entire angular range.

Another way to enhance the angular shift of the scattered beam is to use the arrangement depicted in FIGS. 8 and 9. The beam 82, scattered by TBG 84, is first concentrated by a cylindrical condensing lens 86, and then passed through two cylindrical diverging lenses 88 and 90, having mutually orthogonal axes of curvature. Lens 88 serves as a collimating lens just as does lens 66 in FIG. 6. The axis of lens 90 is perpendicular to the length of the detector array 92. This lens enhances the angular shift of beam 82, so that a small angular shift in the beam as it emanates from the TBG produces a relatively large angular shift in the beam as it approaches the linear detector array.

Figure 10:
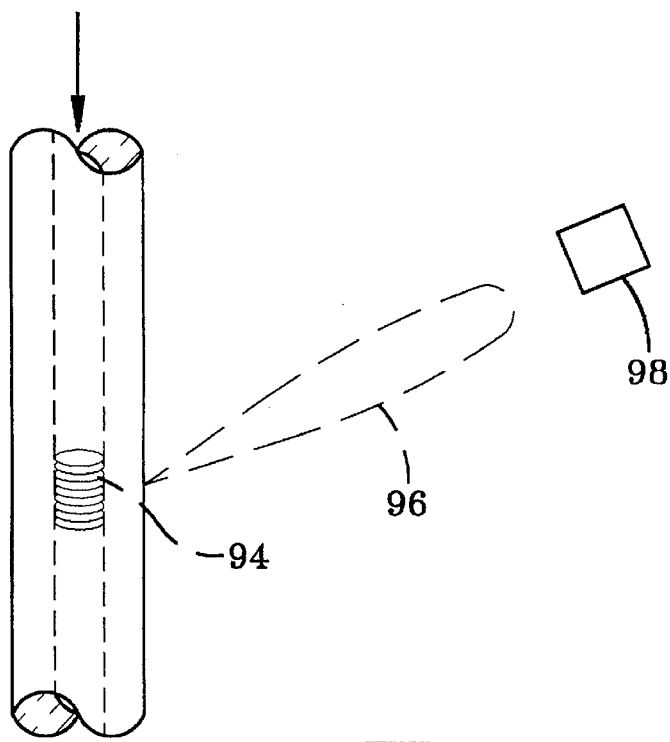
FIG. 10 is a plan view of a simple TBG demodulator using a single light detector.

While the demodulators described above utilize light detector arrays, it is possible to utilize a single light detector where there is only a requirement for a "yes"—"no" decision. As shown in FIG. 10, a TBG 94 produces a scattered beam depicted by an amplitude pattern 96. A single detector 98 responds within a narrow range of angles of the scattered beam. This arrangement can be used, for example, in applications requiring a signal only when the sensing FOBG is undergoing stress greater than a specified level.

Figure 11:
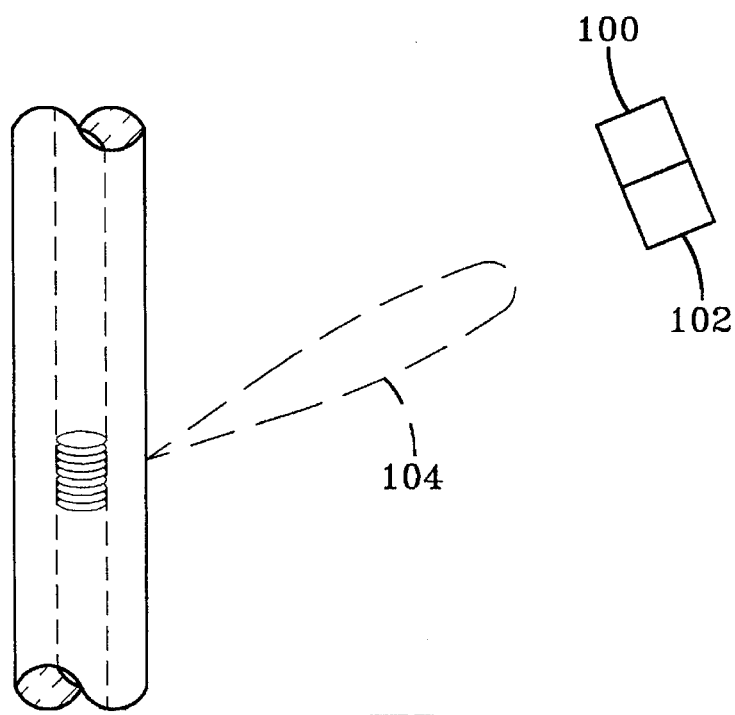
FIG. 11 is a plan view of a simple TBG demodulator using a split diode light detector.

A similar arrangement, shown in FIG. 11, utilizes a split diode detector comprising two detectors 100 and 102, preferably connected in a differential circuit for highly sensitive detection of a small angular shift of the scattered beam 104.

Various modifications can be made to the several embodiments described. For example, the arrangements shown in FIGS. 10 and 11 can be provided with condensing lenses for improved light collection. The demodulator can utilize multiple TBGs and multiple detector arrays to extract information from the light returned by one or more FOBGs. The scattering characteristics of the TBGs can be tailored to particular applications by selecting appropriate spacings and angles for the grating lines, and grating lengths. Many other modifications and variations of the invention are possible in view of the above disclosure. It is therefore to be understood that, within the scope of the appended claims, the invention may be practiced other than as specifically described.

We claim:

1. A demodulator for use in conjunction with a fiberoptic Bragg grating comprising:
   an optical fiber capable of receiving and conducting light reflected by a fiberoptic Bragg grating;
   means, comprising a tapped Bragg grating formed in the core of said optical fiber, for scattering light conducted by the optical fiber at angles varying in dependence on the wavelength of the reflected light; and
   means for detecting shifts in the pattern of the light scattered by the tapped Bragg grating.

2. A demodulator according to claim 1 in which the detecting means comprises means for detecting a shift in the angle at which light is scattered by the tapped Bragg grating.

3. A demodulator according to claim 1 in which the detecting means comprises a linear array of light detectors.

4. A demodulator according to claim 1 including a pair of mirrors having reflecting surfaces disposed in planes that intersect at a line of intersection, and in which a portion of said optical fiber having the tapped Bragg grating is disposed between said mirrors and extends substantially parallel to the line of intersection.

5. A demodulator according to claim 1 including a pair of mirrors having reflecting surfaces disposed in planes that intersect at a line of intersection, in which a portion of said optical fiber having the tapped Bragg grating is disposed between said mirrors and extends substantially parallel to the line of intersection, and in which the detecting means comprises a linear array of light detectors spaced from, but extending alongside, said portion of the optical fiber.

6. A demodulator according to claim 1 including a mirror having a reflecting surface in the form of a cylinder with an elliptical cross-section whereby the mirror has first and second loci defined by parallel, spaced, straight lines, in which a portion of said optical fiber having the tapped Bragg grating is disposed inside said cylinder along one of said lines, and in which the detecting means comprises a straight linear array of light detectors extending along the other of said lines.

7. A demodulator according to claim 1 including a condensing lens between the tapped Bragg grating and the detecting means.

8. A demodulator according to claim 1 including a condensing lens between the tapped Bragg grating and the detecting means and having a cylindrical diverging lens between the condensing lens and the detecting means.

9. A demodulator according to claim 1 including a condensing lens between the tapped Bragg grating and the detecting means and having a first cylindrical diverging lens between the condensing lens and the detecting means, and a second cylindrical diverging lens between the first diverging lens and the detecting means, wherein the cylindrical lenses have axes orthogonal to each other.

10. A demodulator according to claim 1 in which the detecting means comprises means for detecting a shift in the angle at which light is scattered by the tapped Bragg grating, and including means, between the tapped Bragg grating and the detecting means for enhancing the angular shift of the scattered light.

11. A demodulator according to claim 1 in which the detecting means comprises means for detecting a shift in the angle at which light is scattered by the tapped Bragg grating, and including means, comprising a diverging lens, between the tapped Bragg grating and the detecting means for enhancing the angular shift of the scattered light.

12. A demodulator according to claim 1 in which the detecting means comprises means for detecting a shift in the angle at which light is scattered by the tapped Bragg grating, and including means, comprising a convex mirror, between the tapped Bragg grating and the detecting means for enhancing the angular shift of the scattered light.

13. A demodulator according to claim 1 in which the means for detecting shifts in the pattern of the light scattered by the tapped Bragg grating consists of only a single light detector.

14. A demodulator according to claim 1 in which the means for detecting shifts in the pattern of the light scattered by the tapped Bragg grating consists of only two light detectors, arranged side-by side.

15. A sensor comprising:
a first Bragg grating with grating lines arranged to reflect selected wavelengths of light incident on the first grating;
means responsive to a measurand for inducing variations in the spacing of the lines of first grating;
means for directing light to the first Bragg grating;
means comprising a second Bragg grating with grating lines, the second grating being arranged to scatter light reflected by the first Bragg grating; and
light-detecting means, adjacent to the second grating, for detecting shifts in the pattern of the light scattered by the second grating, and thereby detecting variations in the spacing of the lines of the first grating induced by the means responsive to the measurand.

16. A sensor according to claim 15 in which the first Bragg grating comprises grating lines formed in the core of an optical fiber, and in which the means responsive to a measurand comprises means, secured to the optical fiber at least at two locations, for applying a longitudinal stress to the optical fiber.

17. A sensor according to claim 15 in which the light-detecting means comprises means for detecting a shift in the angle at which light is scattered by the second Bragg grating, and including means, between the second Bragg grating and the detecting means for enhancing the angular shift of the scattered light.

18. A sensor comprising:
a source of light consisting of a band of wavelengths;
an optical fiber arranged to conduct light from said source, the optical fiber having a core with at least two sensing Bragg gratings formed therein, each grating having grating lines spaced so that it reflects a selected subband of wavelengths within a band of wavelengths of the light incident thereon, the line spacing for each of said gratings being different from the line spacing for each of the other ones of said gratings, so that the subband of wavelengths reflected by each grating is different as a whole from the subband of wavelengths reflected by each of the other gratings;
means responsive to a measurand for inducing variations in the spacing of the lines of each of said gratings;
means comprising at least one tapped Bragg grating with grating lines, each tapped Bragg grating being arranged to scatter light reflected by at least one of the sensing Bragg gratings; and
light-detecting means, adjacent to each tapped Bragg grating, for detecting shifts in the pattern of the light scattered by each tapped Bragg grating, and thereby detecting variations in the spacing of the lines of the sensing Bragg gratings induced by the means responsive to the measurand.

19. A sensor comprising:
a first length of optical fiber having a first light-conducting path extending along an axis, the first light-conducting path having a region with a periodic spatial variation in its refractive index along the direction of the axis, forming a first Bragg grating with grating lines disposed substantially transverse to said axis whereby the first grating is adapted to reflect selected wavelengths of light along the first light-conducting path;
means, comprising a source of light, for directing light along said light-conducting path;
a second length of optical fiber having a second light-conducting path extending along a second axis, the second length of optical fiber being arranged to receive light reflected by the first Bragg grating in the first length of optical fiber, the second length of optical fiber having a region with a periodic spatial variation in its refractive index along the direction of the second axis, forming a second Bragg grating having grating lines disposed oblique to the second axis, whereby said reflected light in the second light conducting path reaching the second grating is scattered transverse to said second axis at the location of the second grating;
means responsive to a measurand for inducing variations in the spacing of the lines of first grating; and
light-detecting means disposed adjacent to the second grating, for detecting shifts in the pattern of the light scattered by the second grating, and thereby detecting variations in the spacing of the lines of the first grating induced by the means responsive to the measurand.

* * * * *